(12) United States Patent
Brunner

(10) Patent No.: US 7,600,437 B2
(45) Date of Patent: Oct. 13, 2009

(54) DEVICES FOR MEASURING STRINGS OF A RACKET AND BALL QUALITY

(76) Inventor: Adolf Brunner, Ennsweg 35, Radstadt (AT) A-5550

( * ) Notice: Subject to any disclaimer, the term of this patent is extended or adjusted under 35 U.S.C. 154(b) by 0 days.

(21) Appl. No.: 11/803,609

(22) Filed: May 15, 2007

(65) Prior Publication Data

US 2007/0275798 A1 Nov. 29, 2007

(30) Foreign Application Priority Data

May 15, 2006 (EP) .................................. 06009936

(51) Int. Cl.
*G01L 1/04* (2006.01)
(52) U.S. Cl. .................................. 73/862.452
(58) Field of Classification Search ............ 73/862.452, 73/862.453
See application file for complete search history.

(56) References Cited

U.S. PATENT DOCUMENTS

| | | | |
|---|---|---|---|
| 4,055,999 A | | 11/1977 | Cope |
| 4,116,054 A | * | 9/1978 | Howe .................... 73/862.452 |
| 4,590,808 A | * | 5/1986 | Lightfoot et al. ....... 73/862.452 |
| 4,747,314 A | * | 5/1988 | Huang .................... 73/862.452 |
| 4,754,968 A | * | 7/1988 | Fischer ....................... 473/534 |
| 4,794,805 A | * | 1/1989 | Carney et al. .......... 73/862.452 |
| 4,846,002 A | * | 7/1989 | Brunner ................. 73/862.452 |
| 4,876,900 A | * | 10/1989 | Carney et al. .......... 73/862.452 |
| 4,911,441 A | | 3/1990 | Brunner |
| 5,026,055 A | * | 6/1991 | Longeat ....................... 473/556 |
| 5,123,284 A | | 6/1992 | Edinburgh |
| 6,357,282 B1 | * | 3/2002 | Benjamin ....................... 73/81 |

FOREIGN PATENT DOCUMENTS

| | | |
|---|---|---|
| DE | 2916735 | 4/1979 |
| DE | 3225843 A1 | 7/1982 |
| DE | 3532767 A1 | 9/1985 |
| DE | 19608995 C1 | 3/1996 |
| WO | 9110481 A2 | 7/1991 |

OTHER PUBLICATIONS

European Search Report in priority application EP 06009936, dated Oct. 31, 2006.

* cited by examiner

*Primary Examiner*—Max Noori
(74) *Attorney, Agent, or Firm*—Byrne Poh LLP; Matthew T. Byrne

(57) ABSTRACT

In some embodiments, devices for measuring strings of a racket include a housing and a button. The devices also include a setting device that determines the frame size of the racket in response to the button being depressed and a spring system that adjusts pre-tension of the strings in response to the button being depressed. The devices further include a calibrated leaf spring having strain gages and an adjustment screw which is affixed to the button and which makes the starting measuring pressure onto the calibrated leaf spring adjustable. The devices still further include a fixing part which becomes fixed to the housing when force is applied to the button that causes the spring system to reach a specified level of compression and a display that reflects pressure on the strings in response to pressure applied to the strain gages.

6 Claims, 6 Drawing Sheets

DEVICES FOR MEASURING STRINGS OF A RACKET AND BALL QUALITY

CROSS REFERENCE TO RELATED APPLICATION

This application claims the priority under 35 U.S.C. § 119 to European Patent Application No. EP06009936, filed May 15, 2006, which is hereby incorporated by reference herein in its entirety.

TECHNICAL FIELD

The disclosed subject matter relates to devices for measuring strings of a racket and ball quality.

BACKGROUND

The game of tennis, and similar racket-based games such as racket ball and squash, have wide spread popularity around the world. When playing racket-based games, whether for recreation or professionally, it is important to have a racket with proper string tension.

Current devices for measuring string tension are inadequate in that none make a combined measurement of the racket string hardness and the string elasticity of the racket string tension, make a measurement racket string hardness and string elasticity simultaneously and independently of the size of the racket head and its string tension density, have a high measured value resolution and are insensitive with respect to side effects such as the influence of temperature and different conditions when playing, and permit self-adjustment of the device in the event of side effects.

SUMMARY

Devices for measuring strings of a racket and ball quality are provided. In some embodiments, a device for measuring strings of a racket comprises: a housing; a button; a setting device that determines the frame size of the racket in response to the button being depressed; a spring system that adjustments pre-tension of the strings in response to the button being depressed; a calibrated leaf spring having strain gages; an adjustment screw which is affixed to the button and which makes the starting measuring pressure onto the calibrated leaf spring adjustable; a fixing part which becomes fixed to the housing when force is applied to the button that causes the spring system to reach a specified level of compression; and a display that reflects pressure on the strings in response to pressure applied to the strain gages.

In some embodiments, a device for measuring ball quality comprises: a housing; a button; a spring system that adjustments pre-tension on the ball in response to the button being depressed; a calibrated leaf spring having strain gages; an adjustment screw which is affixed to the button and which makes the starting measuring pressure onto the calibrated leaf spring adjustable; a fixing part which becomes fixed to the housing when force is applied to the button that causes the spring system to reach a specified level of compression; and a display that reflects pressure on the ball in response to pressure applied to the strain gages.

DETAILED DESCRIPTION

Devices for measuring strings of a racket and ball quality are provided. In some embodiments, these devices provide for the measurement of the string hardness and string elasticity of rackets, such as tennis rackets, racket ball rackets, squash rackets, and any other suitable rackets. In some embodiment, a racket may comprise a handle and a frame bounding an area strung with strings. The strings may be woven with one another within the frame boundary such that they form a square mesh network which provides the required contact surface for a game ball. The strings may also be configured to keep the air resistance formed by the strings low when swinging the racket. In some embodiments, devices are used to measure ball quality.

Figure 1:
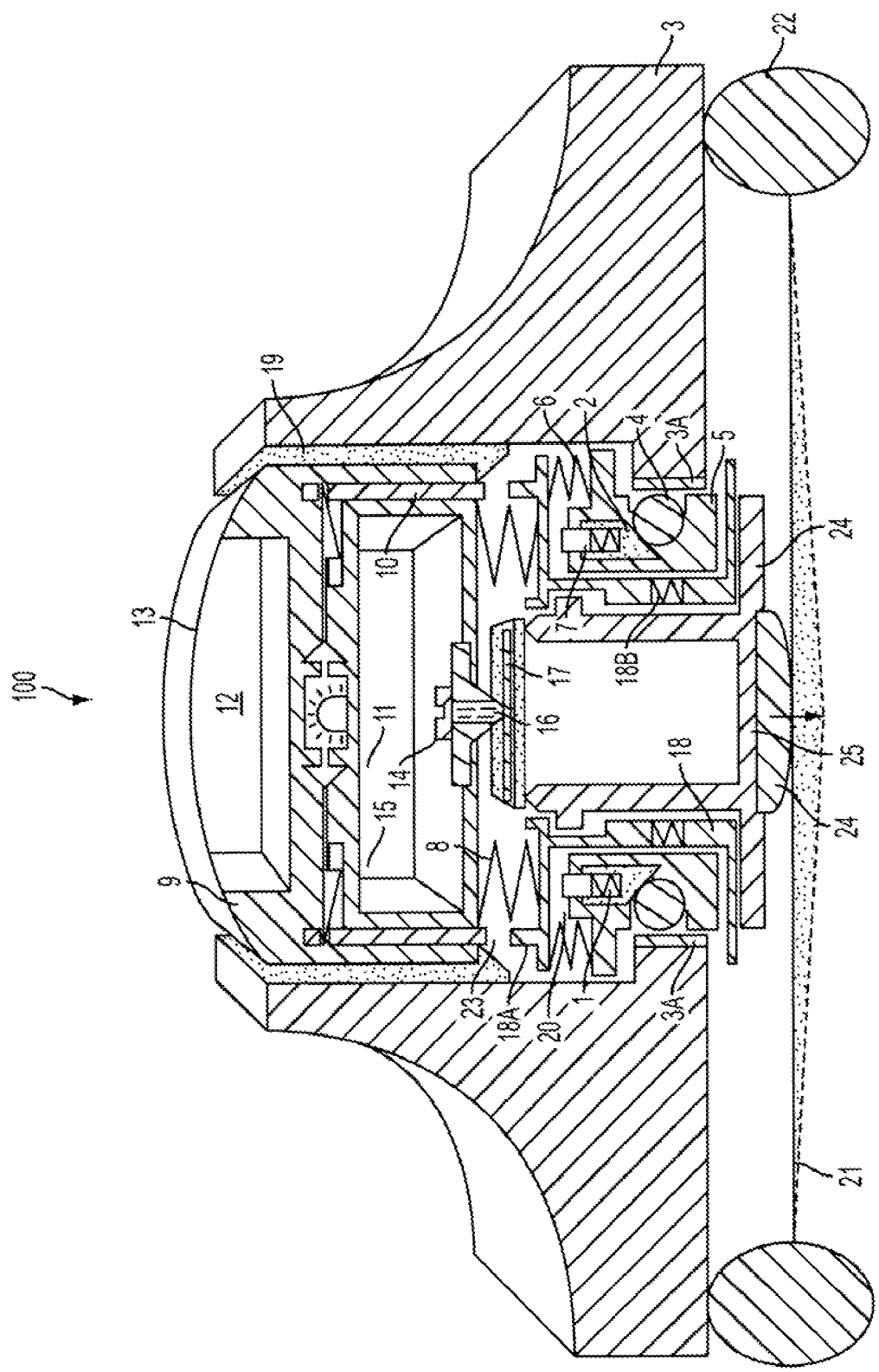
FIG. 1 is a cross-sectional view of a device for measuring string tension hardness of a racket in accordance with some embodiments.

FIG. 1 shows a measuring device 100 in cross-section in accordance with some embodiments. For measurement purposes, the base of the device housing 3 is placed on a racket frame 22 with respect to its center. The measurement is started and completed by pressing on switch 9 along slide track 10 until a signal sound is emitted. The measuring device can then be removed from the racket. The values of the racket string tension hardness and of the stretch capability of the strings appear on a digital display 12 of the measuring device.

When the measuring device is placed onto the racket frame 22, the connection part 18 is pressed onto the pressure surface 24 and 25, whereby the pressure surface 24, 25 is in contact with the racket strings 21.

Four paths have to be overcome within the measuring device during the total measuring process: the measuring path 20 via the spring 6; the measuring path 23 via the spring 8; the measuring path 50 via the spring 51 (shown in FIG. 6); and the lead path via the spring 8 in the device part 18.

As the measuring process progresses, the spring 8 presses onto connection part 18 and thus onto pressure surfaces 24 and 25 because of the pressure onto switch 9, and path 20 is closed simultaneously by overcoming compression spring 6. During this process, the connection part 18 is closed with the function part 7 causing the housing part 2 to press clamping ball 4 onto the track 3A via the spring 1, whereby device part 5 is fixed in the housing 3. The lead path 20 is thus closed and the ball 4 fixes the part 5 of the device within the framework of the height variation between the device housing 3 and the racket frame 22, with the spring 6 and spring 18B passing the built-up pressure onto the pressure surface 24 and 25 and further onto the racket strings 21. This pressure as a result provides the required pre-tensioning for the pre-adjustment by means of the contact part 24 and 25 on the racket strings for the following main measurement process.

The basic measuring process starts after the pre-procedure. In this procedure, the counter-pressure of the racket strings 21 is directly transferred via the pressure surface 24 and the compensation rocker 25 onto calibrated leaf springs with affixed strain gages 17 and the measuring process is thus initiated. Strain gages 17 may use a compensation rocker 16 (shown in FIG. 6) for pressure transmission and may be adjusted using an adjustment screw 14 (also shown in FIG. 6). The measuring process is maintained by temporary pressing on the push-button 9 until the measuring path 23 is closed and the setting device for the racket head size 19 contacts the sensor 18A, which signifies that all paths and measurement paths have finished closing and thus that the measuring process is completed.

As will be apparent to one of skill in the art, any suitable circuitry 15 can be used to measure the stress on strain gages 17 and reflect that stress on a display 12 visible through a transparent window 13. These electronics may be powered by a battery in a compartment 11.

Figure 2:
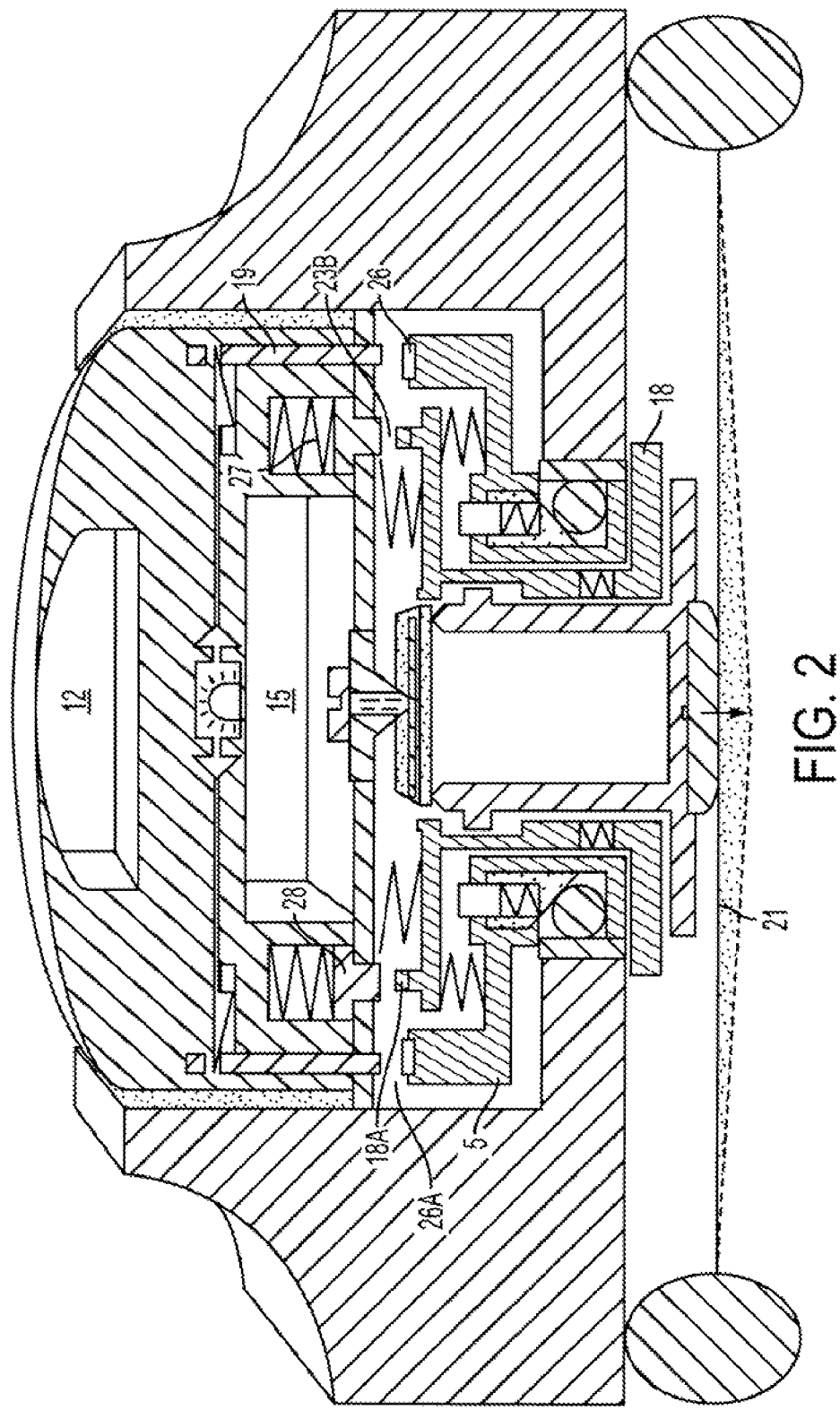
FIG. 2 is a cross-sectional view of a device for measuring the elasticity coefficient of a racket in accordance with some embodiments.

FIG. 2 shows the measuring device as in FIG. 1 with an expanded measurement range for the measurement of the elasticity coefficient. The total measuring path 23B is affixed in accordance with FIG. 2 between the setting device of the racket head size 19 to be measured with part 5 and sensor 26 over a larger path 26A which also takes account of the run-out path 27 and 28. The final stage of the measurement of the string tension hardness of the racket head strings is designed such that it will take place between the function part 18 and 18A and the measuring path 23B and the run-out path part 28. On the measurement of the elasticity coefficient of the strings 21 after the measurement of the string tension hardness in accordance with FIG. 1, the parts 19 and 26 from the total path 26A are brought into contact with one another and the end of the total measurement is transmitted to the electronic system by this closure. In this measuring process, the parts 18A and 28, which are closed, are designed via the spring 27 so that the required run-out path for the measurement of the elasticity coefficient extends over a longer path, as shown by 26A. The measurement result of the elasticity coefficient takes place by means of an electronic evaluation circuit 15 and display 12.

Figure 3:
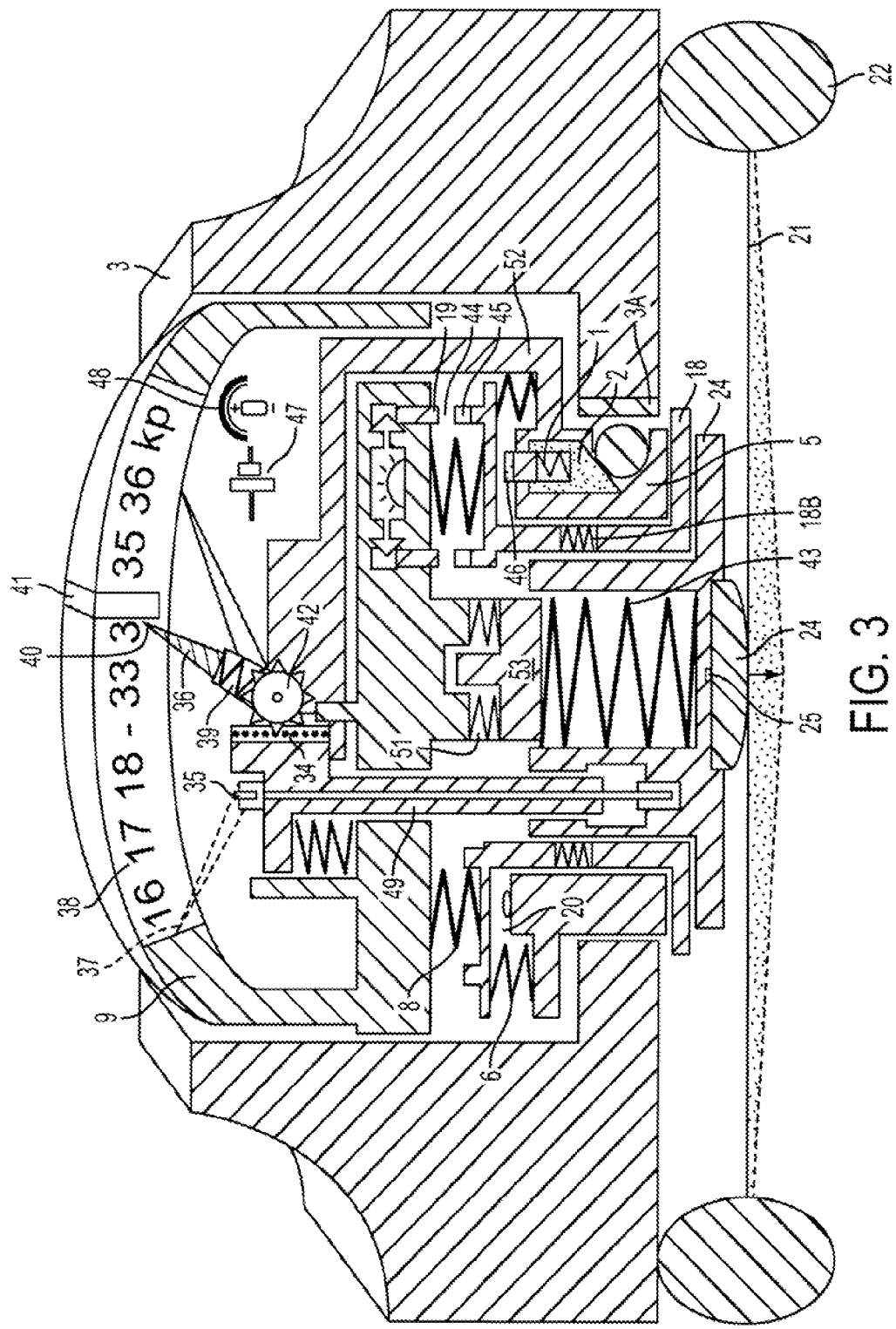
FIG. 3 is a cross-sectional view of a mechanical device for measuring string tension hardness of a racket in accordance with some embodiments.

FIG. 3 shows a modification in accordance with a mechanical functional principle on the basis of FIG. 1 in accordance with some embodiments. The measuring procedure starts as described by FIG. 1 with the pressing of the switch 9 temporarily until a signal sounds. When the measuring device 3 is placed onto the racket head frame 22, the connection part 18 is pressed via the spring 8 onto the pressure surface 24 and 25 so that the pressure surface lies on the racket strings 21. During the measuring procedure, four paths have to be overcome within the measuring device: measuring path 20 via the spring 6; measuring path 44 via the spring 8; measuring path 50 via the spring 51 (shown in FIG. 6); and the lead path via the spring 18B in part 18. On the progressing of the measuring procedure, the spring 8 of the part 18 is pressed via pressure on switch 9 onto the pressure surface 24 and 25 and the path 20 is closed by overcoming the pressure on spring 6. As a consequence, the part 18 comes into contact with the function part 46 and the ball 4 is pressed onto the fixing track 3A by spring 1 and part 2, whereby a clamping process is exerted onto the housing 3. The lead path is thus simultaneously closed and ball 4 fixes the part 5 for the vertical adjustment between 3 and the racket head frame 22, with the spring 6 passing on the built-up pressure to 21 via 24 and 25. The pressure of springs 6 and 51 provides the required pre-tension for the pre-adjustment onto 21 via 24 and 25 for the measuring procedure. The latter part of the measuring procedure starts when part 5 is fixed by temporary pressing on the switch 9. The end of measurement takes place via the mechanical build-up of the positions 19 and 45 and is reached by a signal sound via the sensory signal transducer 48. The altered path distance is transferred as the measuring path via the gear 42 onto the sliding device 36 and then onto the display 41. The function for mechanical and automatic measuring procedures in a measuring device is reached.

Figure 4:
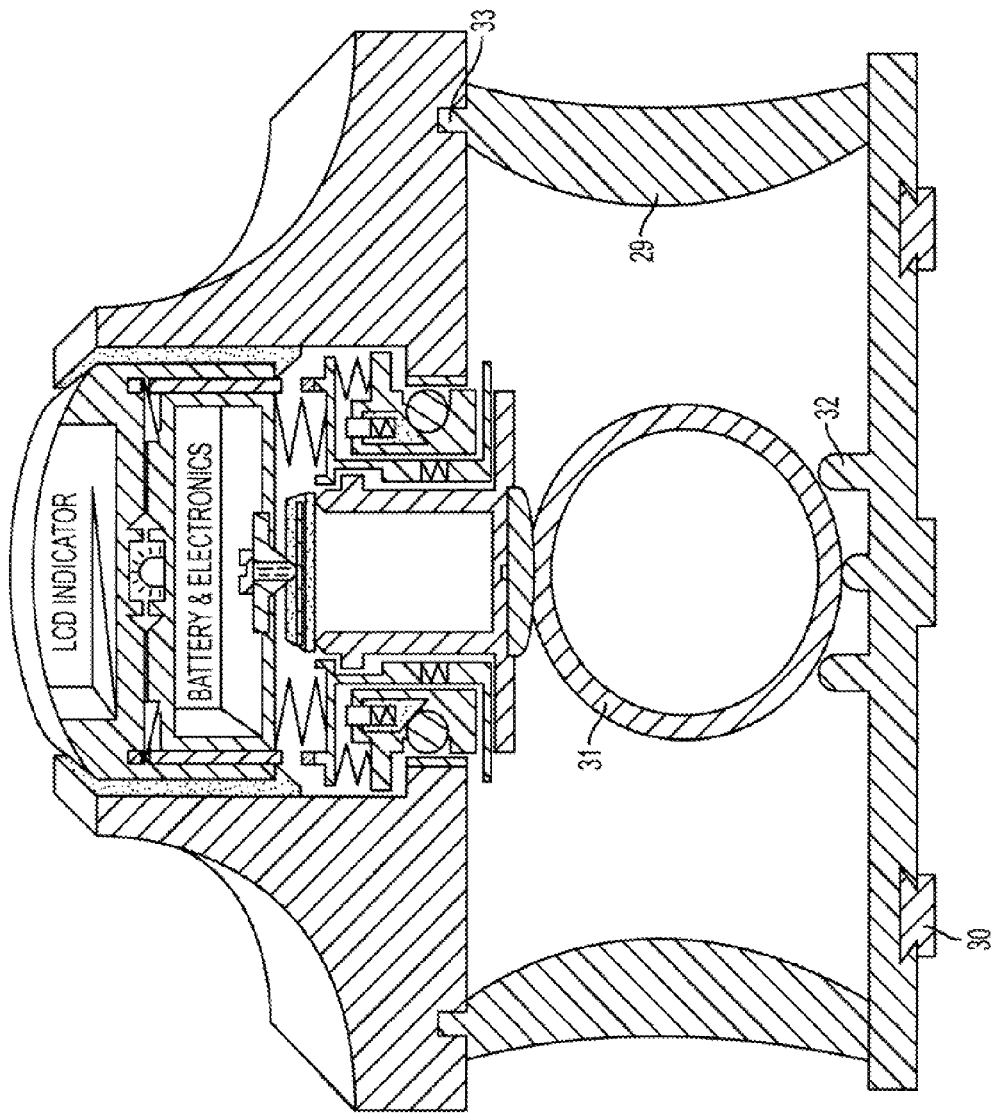
FIG. 4 is a cross-sectional view of a device for measuring the quality of balls in accordance with some embodiments.

FIG. 4 shows the measuring device as in FIG. 1 which is suitable for measuring tennis ball quality as modified by means of elements 29, 30, 32 and 33. Part 32 holds tennis ball 31. The counter-pressure base is the pressure surface 24, 25. The measuring procedure takes place as with FIG. 1.

Figure 5:
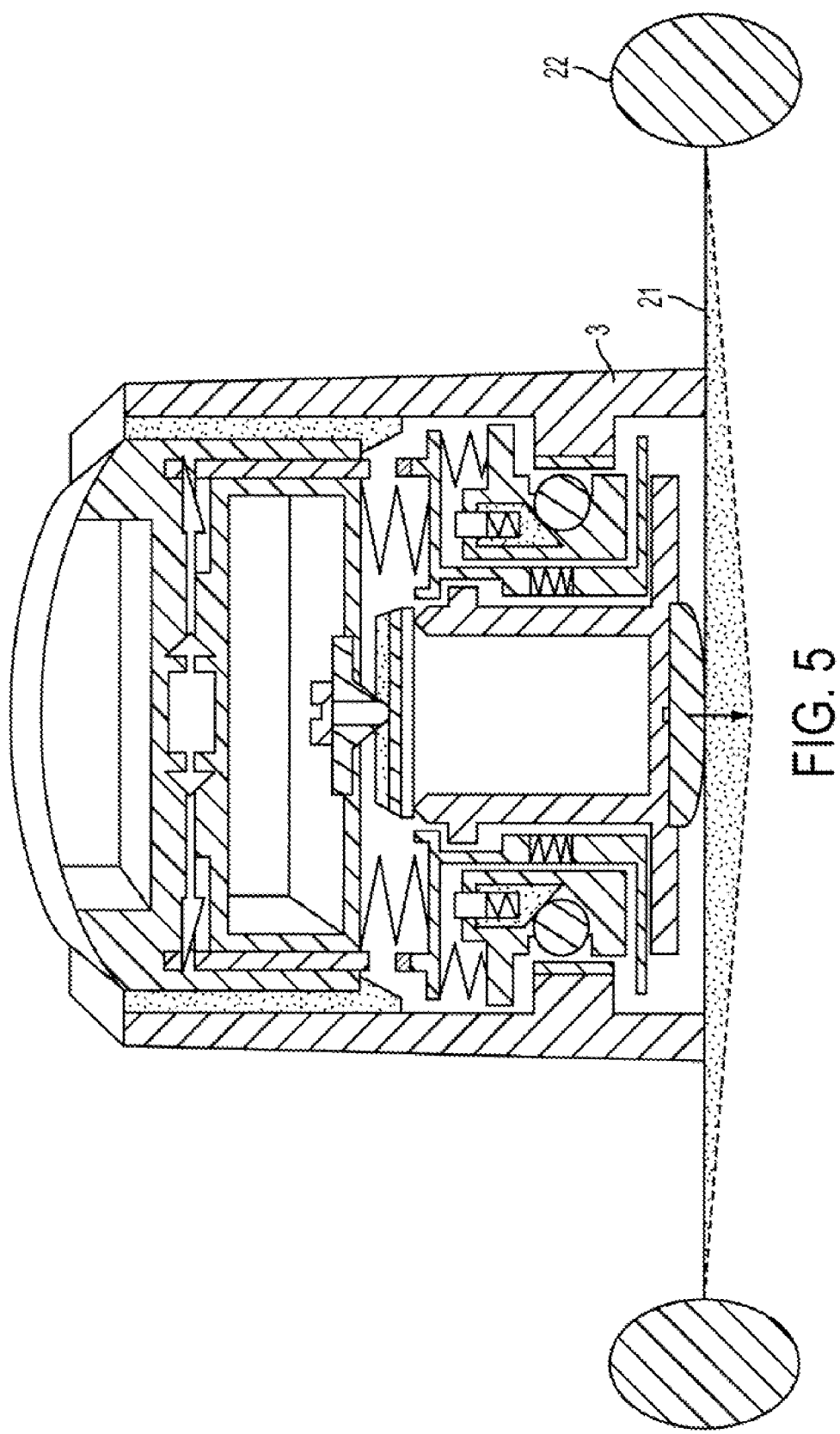
FIG. 5 is a cross-sectional view of a device for measuring string tension hardness of a racket that sits on the strings in accordance with some embodiments.

FIG. 5 shows as an example the measuring device as in FIG. 1, with the exception of the modification of the measuring device base 3, which does not lie on the tennis racket frame 22, but directly on the strings 21.

Figure 6:
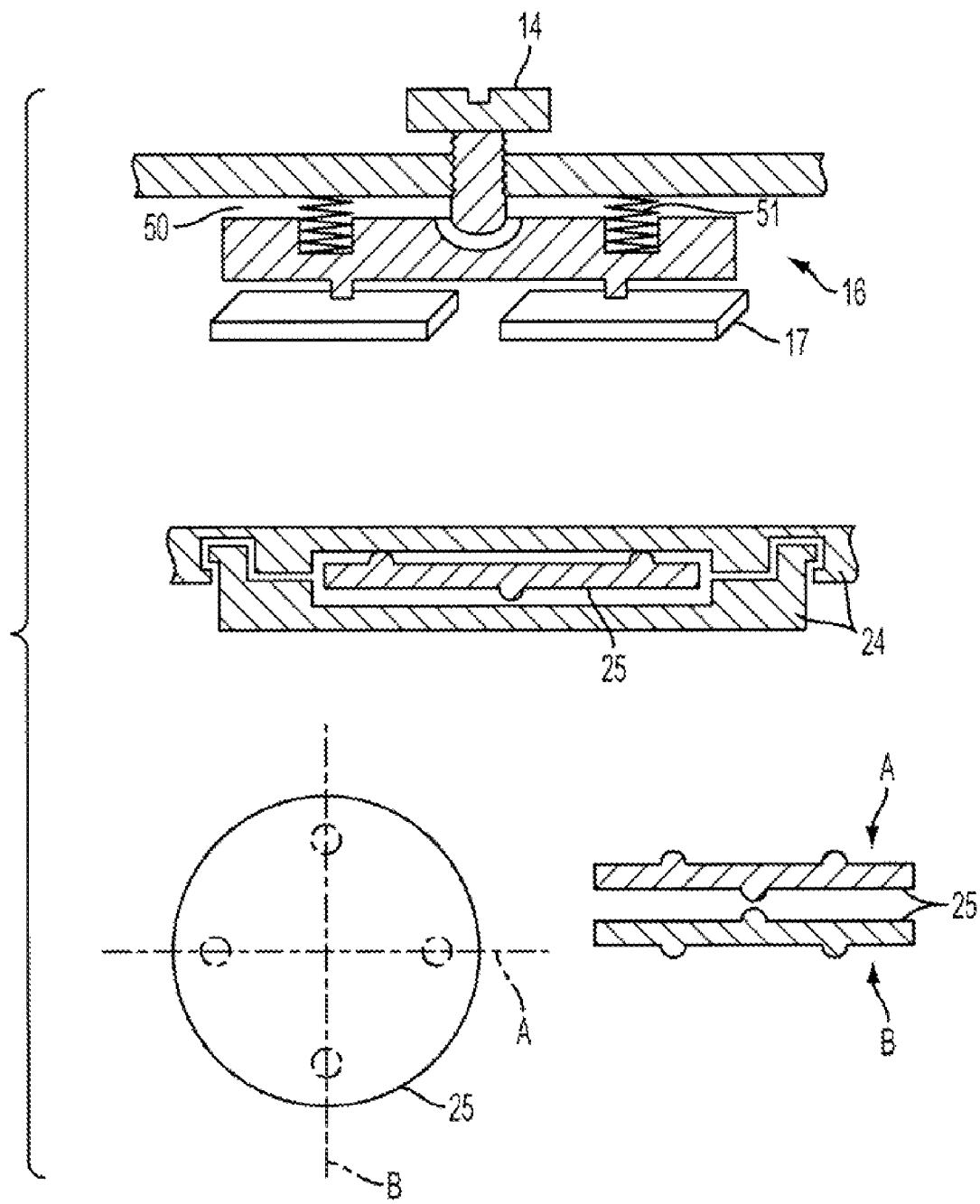
FIG. 6 includes cross-sectional views of details of FIG. 1 is accordance with some embodiments.

FIG. 6 shows detailed representations of the pressure surface 24 and 25 and of the compensation rocker 16.

As shown, various embodiments of the invention provide a significant enrichment of ball games using rackets with a net-strung racket head, in particular, for tennis, whether for amateurs or professionals. The string tension hardness and string elasticity of the racket head strings can be optimized by means of the device, thereby saving the replacement of racket material which is still good and relieving physical strain on users (which may result in relief of cases of tennis elbow).

The following reference numerals are used throughout the figures: 1—spring for the vertical adjustment for the lead path of the measuring procedure; 2—fixing part for the vertical regulation; 3—device base with roughened surface 3A for the purpose of fixing the ball 4; 4—clamping ball for the fixing of the vertical position; 5—compensation rocker 25 relative between the racket frame height and the string tension moving part for the vertical compensation with different racket frame height; 6, 8—springs of different tensioning force for the lead path and adjustment of the measuring procedure; 7—function part and sensor of the lead path boundary and switching on of the electronics; 9—switch button for the switching on and temporary switching of the measuring procedure; 10—slide track for pressure button; 11—compartment for battery; 12—measured value display which is contained within transparent window 13; 14—adjustment screw—starting point setting for the measuring procedure; 15—container for electronics; 16—compensation rocker for the pressure transmission; 17—calibrated leaf springs with strain gages; 18, 18A, 18B—function contact part for lead path and measurement path boundary with sensor 18A and spring 18B for the lead path; 19—device for racket head size adjustment; 20—distance path for the pre-adjustment and electronic activation; 21—racket head strings; 22—racket head frame, which may have different heights and strengths; 23, 26A—total measuring path, plus electrical and mechanical end stops for the measuring procedure; 23B—in FIG. 2, replaces the electrical function of 23 in accordance with FIG. 1; 24—pressure contact surface of the device on the racket head strings; 25—compensation rocker as pressure transfer to the racket head strings; 26, 19—mechanical end stops of the total measurement path—as in FIG. 1, plus sensory electronic contact for the end of the measurement of the string elasticity coefficients in the case in accordance with FIG. 2; 26A—measurement path for elasticity coefficient; 27—springs for the run-out path for the measurement of the elasticity coefficient; 28—run-out path function part for the measurement of the elasticity coefficient; 29—device modification for the measurement of the tennis ball quality; 30—anti-slip soft rubber stoppers; 31—tennis ball; 32—counter-pressure surface and centering of the tennis ball; 33—fixing element for the measuring device and the tennis ball containment; 34—toothed bolt for the transfer of the measuring path onto the scale band; 35—adjustment device for the adjustment of the measurement display; 36—sliding device for the movement of the measurement display 41; 37—starting adjustment point for the scale band, with calibrated display in Kp; 38—calibrated display of the measured results in Kp; 39—longitudinal compensation spring for the sliding device 36; 40—position 36 slides 41 up to and into the end position; 41—display pin that measures maximum value and is resettable after the measurement; 42—gear for the measurement path transfer to the display field; 43—linear compression spring for the triggering of different measuring paths in dependence on the counter-pressure and the running paths; 44—default path for the fixing of the measuring stop process; 45—sensor-triggered electrical stop contact for the bounding of the path on a signal sound; 46—automatic pre-adjustment path for the measuring procedure; 47—battery for electronics and signal transducer; 48—signal trigger; 49—adjustment element; 50—path for adjustment of the measuring pressure transfer; 51—bias spring for adjustment; 52—vertical adjustment part for different frame heights of the rackets; and 53—counter-piece for the receiving of the spring 51 in accordance with FIG. 3.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A device for measuring strings of a racket, comprising:
   a housing;
   a button;
   a setting device that compensates for the height in the frame of the racket in response to the button being depressed;
   a spring system that adjusts pre-tension of the strings in response to the button being depressed;
   a calibrated leaf spring having a strain gage that receives pressure from the strings;
   an adjustment screw which is affixed to the button, which causes pressure to be applied to the calibrated leaf spring when the button is depressed, and which makes the starting measuring pressure onto the calibrated leaf spring adjustable; and
   a display that reflects pressure on the strings in response to pressure applied to the strain gage.

2. The device of claim 1, further comprising a run-out path that closes before the button is fully depressed and that triggers measurement of the string tension hardness of the strings.

3. The device of claim 1, wherein the housing is configured to be placed on the strings during measurement.

4. The device of claim 1, wherein the display indicates string tension hardness.

5. The device of claim 1, wherein the display indicates elasticity of the strings.

6. A device for measuring ball quality of a ball, comprising:
   a housing;
   a button;
   a setting device that compensates for the size of the ball in response to the button being depressed;
   a spring system that adjusts pre-tension on the ball in response to the button being depressed;
   a calibrated leaf spring having a strain gage that receives pressure from the ball;
   an adjustment screw which is affixed to the button, which causes pressure to be applied to the calibrated leaf spring when the button is depressed, and which makes the starting measuring pressure onto the calibrated leaf spring adjustable; and
   a display that reflects pressure on the ball in response to pressure applied to the strain gage.

\* \* \* \* \*